(12) United States Patent
Yang et al.

(10) Patent No.: US 11,770,039 B2
(45) Date of Patent: Sep. 26, 2023

(54) ROTOR COOLING WITH HEAT CONDUCTIVE MATERIAL

(71) Applicant: GM Global Technology Operations LLC, Detroit, MI (US)

(72) Inventors: Xiaofeng Yang, Troy, MI (US); Thomas W. Nehl, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 72 days.

(21) Appl. No.: 17/201,251

(22) Filed: Mar. 15, 2021

(65) Prior Publication Data

US 2022/0294293 A1    Sep. 15, 2022

(51) Int. Cl.
  *H02K 1/32*    (2006.01)
  *H02K 1/27*    (2022.01)
  *H02K 1/276*   (2022.01)

(52) U.S. Cl.
  CPC .............. *H02K 1/32* (2013.01); *H02K 1/276* (2013.01)

(58) Field of Classification Search
  CPC ................................. H02K 1/32; H02K 1/276
  USPC ......................................................... 310/61
  See application file for complete search history.

(56) References Cited

U.S. PATENT DOCUMENTS

| | | | | |
|---|---|---|---|---|
| 5,889,342 A * | 3/1999 | Hasebe | ..................... | H02K 1/32 310/156.19 |
| 7,705,503 B2 * | 4/2010 | Takahashi | ................ | H02K 1/32 310/216.104 |
| 9,030,062 B2 * | 5/2015 | Matsumoto | ............... | H02K 1/32 310/58 |
| 9,041,261 B2 * | 5/2015 | Yamamoto | ............... | H02K 1/27 310/58 |
| 9,806,572 B2 * | 10/2017 | Yamagishi | ............... | H02K 9/19 |
| 10,116,178 B2 * | 10/2018 | Horii | ......................... | H02K 1/28 |
| 10,574,117 B2 * | 2/2020 | Okazaki | ................ | H02K 9/197 |
| 11,545,860 B2 | 1/2023 | Lahr et al. | | |
| 2004/0217666 A1 | 11/2004 | Mellor et al. | | |
| 2012/0299403 A1 * | 11/2012 | Stahlhut | ................... | H02K 1/32 310/59 |
| 2013/0020889 A1 * | 1/2013 | Yamamoto | ........... | H02K 1/2766 310/59 |
| 2013/0026871 A1 | 1/2013 | Dam et al. | | |
| 2013/0313923 A1 * | 11/2013 | Hamer | .................. | H02K 9/223 29/598 |
| 2013/0334910 A1 * | 12/2013 | Takahashi | .............. | H02K 9/223 29/598 |
| 2014/0028139 A1 * | 1/2014 | Hamer | ................. | H02K 1/2766 264/261 |

(Continued)

FOREIGN PATENT DOCUMENTS

JP    2010193660 A    9/2010

*Primary Examiner* — Alex W Mok
(74) *Attorney, Agent, or Firm* — Vivacqua Crane, PLLC (57) ABSTRACT

A rotor core for an electric motor includes a core stack including a plurality of identical lamination plates, each lamination plate including a plurality of magnet slots formed therein, the magnet slots of each of the lamination plates axially aligned and adapted to support a plurality of permanent magnets therein, and a plurality of heat conductive inserts extending axially through the core stack and adapted to conduct heat from inner portions of the core stack outward toward distal ends of the core stack.

14 Claims, 8 Drawing Sheets

(56) References Cited

U.S. PATENT DOCUMENTS

| | | | |
|---|---|---|---|
| 2014/0070637 A1* | 3/2014 | Hamer | H02K 1/2773 |
| | | | 29/598 |
| 2016/0036276 A1* | 2/2016 | Yamagishi | H02K 9/19 |
| | | | 310/59 |
| 2016/0134163 A1 | 5/2016 | Hamanaka et al. | |
| 2016/0181896 A1 | 6/2016 | Masubuchi et al. | |
| 2016/0226326 A1 | 8/2016 | Gotschmann et al. | |
| 2016/0261158 A1* | 9/2016 | Horii | H02K 1/28 |
| 2016/0294262 A1 | 10/2016 | Yomoda et al. | |
| 2017/0155292 A1* | 6/2017 | Kimura | H02K 1/2706 |
| 2018/0375395 A1* | 12/2018 | Yamagishi | H02K 1/32 |
| 2019/0238017 A1* | 8/2019 | Ohira | H02K 1/32 |
| 2022/0294293 A1 | 9/2022 | Yang et al. | |
| 2022/0337111 A1 | 10/2022 | Lahr et al. | |

\* cited by examiner

ROTOR COOLING WITH HEAT CONDUCTIVE MATERIAL

INTRODUCTION

The present disclosure relates to a permanent magnet rotor for an electric machine in an automobile.

A PM motor is an ac motor that uses magnets imbedded into or attached to the surface of the motor's rotor. The magnets are used to generate a constant motor flux instead of requiring the stator field to generate one by linking to the rotor, as is the case with an induction motor. A permanent magnet motor can be separated into two main categories: surface permanent magnet motors (SPM) and interior permanent magnet motors (IPM). Both types generate magnetic flux by the permanent magnets affixed to or inside of the rotor.

SPM motors have the magnets affixed to the exterior of the rotor surface. Because of this mechanical mounting, their mechanical strength is weaker than that of IPM motors. The weakened mechanical strength limits the motor's maximum safe mechanical speed. In addition, these motors exhibit very limited magnetic saliency. Inductance values measured at the rotor terminals are consistent regardless of the rotor position. Because of the near unity saliency ratio, SPM motor designs rely significantly, if not completely, on the magnetic torque component to produce torque.

IPM motors have the permanent magnet imbedded into the rotor itself. Unlike their SPM counterparts, the location of the permanent magnets make IPM motors very mechanically sound, and suitable for operating at very high speeds. These motors also are defined by their relative high magnetic saliency ratio. Due to their magnetic saliency, an IPM motor has the ability to generate torque by taking advantage of both the magnetic and reluctance torque components of the motor. These qualities offer advantages when using IPM motors in automotive applications.

Flux in a permanent magnet motor is generated by the magnets. The flux field follows a certain path, which can be boosted or opposed. Boosting or intensifying the flux field will allow the motor to temporarily increase torque production. Opposing the flux field will negate the existing magnet field of the motor. A reduced magnet field will limit torque production.

Permanent magnets are not permanent and do have limited capabilities. Certain forces can be exerted onto these materials to demagnetize them. In other words, it is possible to remove the magnetic properties of the permanent magnet material. A permanent magnetic substance can become demagnetized if the material is significantly strained or allowed to reach significant temperatures.

High temperatures force the magnetic particles in a permanent magnet to become agitated. The magnetic dipoles have the ability to withstand some amount of thermal agitation. However, long periods of agitation can weaken a magnet's strength, even if stored at room temperature. In addition, all magnetic materials have a threshold known as the "Curie temperature," which is a threshold that defines the temperature at which the thermal agitation causes the material to completely demagnetize.

A key property for stable magnet materials is to keep all of its domain atoms rotate in the same direction. When the magnets are exposed to heat, the balance between temperature and magnet atoms are disturbed affecting their magnetic properties. In other words, the tiny magnetic atoms act like tiny magnets themselves and together to form a large magnetic force field. When they are oriented randomly in different directions, the total magnetism is zero.

The higher the temperature, the faster the magnet domains move and become more disordered. Depending on the degree of elevated temperature, a magnet strength can be temporarily decreased or permanently damaged. On the contrary, cooling the magnet can cause the magnet to have a stronger magnetic field with the magnet atoms having less vibration and the magnetic field becoming more steadily concentrated in a given direction. Assuming the motor is operating within its intended design window, the decrease in flux density is temporary and will begin to recover as the magnet cools. If the maximum temperature rating of the magnets is exceeded, however, partial demagnetization will occur and permanently alter the performance of the motor. Thus, while current rotors for electric machines in automotive applications achieve their intended purpose, there is a need for a new and improved rotor having heat conductive material and cooling channels formed therein to spread heat generated within the rotor more evenly across the rotor core and to lower to maximum temperatures experience by the rotor core.

SUMMARY

According to several aspects of the present disclosure, a rotor core for an electric machine in an automobile includes a core stack including a plurality of identical lamination plates, each lamination plate including a plurality of magnet slots formed therein, the magnet slots of each of the lamination plates axially aligned and adapted to support a plurality of permanent magnets therein, and a plurality of heat conductive inserts extending axially through the core stack and adapted to conduct heat from inner portions of the core stack outward toward distal ends of the core stack.

According to another aspect, each of the plurality of heat conductive inserts comprises a single column extending axially through an entire length of the core stack.

According to another aspect, each of the plurality of lamination plates includes a plurality of openings formed therein, wherein when the plurality of lamination plates are assembled to form the core stack, the plurality of openings within each of the plurality of lamination plates are axially aligned and define a plurality of axial cavities extending axially through the core stack, each of the plurality of heat conductive inserts comprising a column of cast in place heat conductive material within one of the plurality of axial cavities.

According to another aspect, each of the plurality of lamination plates includes a plurality of openings formed therein, wherein when the plurality of lamination plates are assembled to form the core stack, the plurality of openings within each of the plurality of lamination plates are axially aligned and define a plurality of axial cavities extending axially through the core stack, each of the plurality of heat conductive inserts comprising a column of heat conductive material that is inserted within one of the plurality of axial cavities.

According to another aspect, each of the plurality of heat conductive inserts comprises a plurality of column segments axially aligned and extending axially through an entire length of the core stack, each column segment extending through a portion of the plurality of lamination plates.

According to another aspect, each of the plurality of heat conductive inserts comprises a plurality of column slices axially aligned and extending axially through an entire length of the core stack, one column slice of each of the plurality of heat conductive inserts positioned within each one of the plurality of lamination plates.

According to another aspect, each of the plurality of heat conductive inserts includes a coolant passage extending axially through the entire length of the rotor.

According to another aspect, the coolant passage within each of the plurality of heat conductive inserts is connected to a central coolant supply, wherein coolant is fed into the coolant passage of each of the plurality of heat conductive inserts at a first distal end of the rotor, and exits the coolant passage of each of the plurality of heat conductive inserts at a second distal end of the rotor.

According to another aspect, each of the plurality of heat conductive inserts is positioned such that a distance between an outer edge of each of the plurality of heat conductive inserts and any portion of any of the plurality of magnet slots is at least 2 millimeters, and a distance between the outer edge of each of the plurality of heat conductive inserts and an inner diameter of the core stack is at least 2 millimeters.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
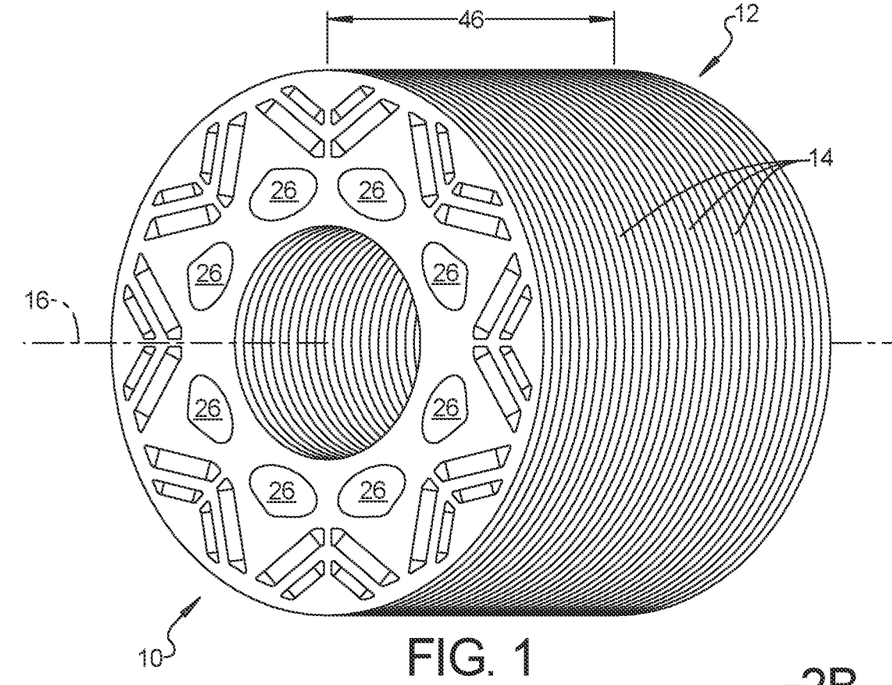
FIG. 1 is a perspective view of a core stack for a rotor of an electric machine for an automobile according to an exemplary embodiment.

Referring to FIG. 1, a rotor core 10 for an electric machine of an automobile includes a core stack 12 including a plurality of identical lamination plates 14. The rotor core 12 is from an electric machine within an automobile, such as, but not limited to, a starter, an alternator, a starter/generator, or other electric motor. Each of the lamination plates 14 is manufactured from a ferrous material, such as but not limited to steel or non-orientated electrical steel. The lamination plates 14 are disposed adjacent each other along a central axis 16 to define the core stack 12.

Figure 2A:
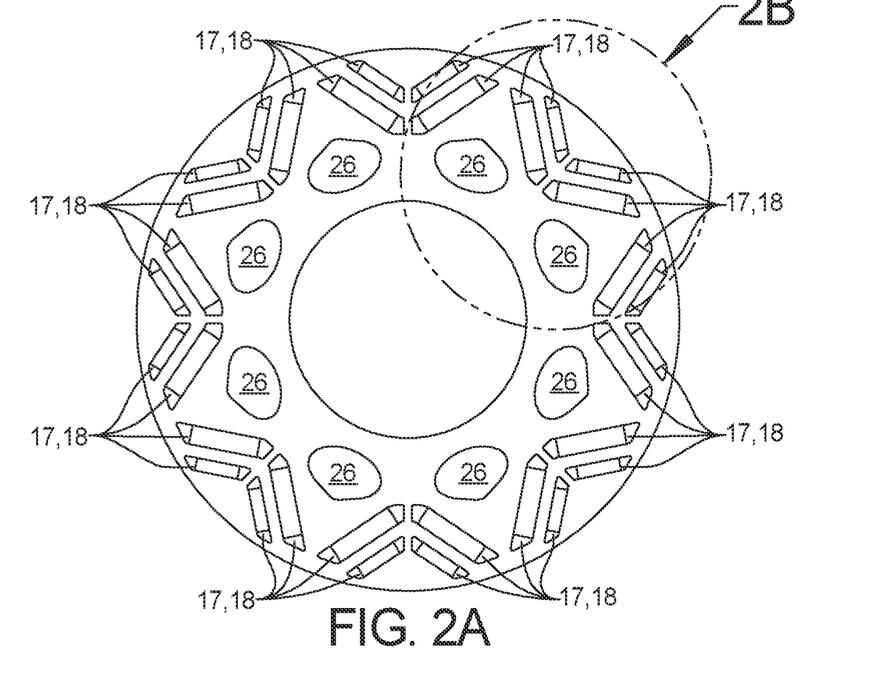
FIG. 2A is an end view of an exemplary embodiment of the core stack shown in FIG. 1.

Referring to FIG. 2A, each of the lamination plates 14 includes a plurality of apertures 17 formed therein. The lamination plates 14 are aligned along the central axis 16 relative to one another such that the apertures 17 of each of the lamination plates 14 are axially aligned with the corresponding apertures 17 in adjacent lamination plates 14 to define a plurality of magnet slots 18. The magnet slots 18 extend axially through the core stack 12 parallel to the central axis 16. The magnet slots 18 are adapted to support a plurality of permanent magnets therein.

In the exemplary embodiment shown in FIG. 1 and FIG. 2A, the core stack 12 includes eight symmetrical groups of magnet slots 18 evenly spaced circumferentially around the core stack 12. Each group of magnet slots 18 includes four magnet slots 18 which are oriented in a V-shape. The magnet slots 18 of each group further define outer flux guides 20, middle flux guides 22 and inner flux guides 24. The outer, middle and inner flux guides 20, 22, 24 provide a path for electrical flux currents during operation of the rotor core 10.

Figure 2B:
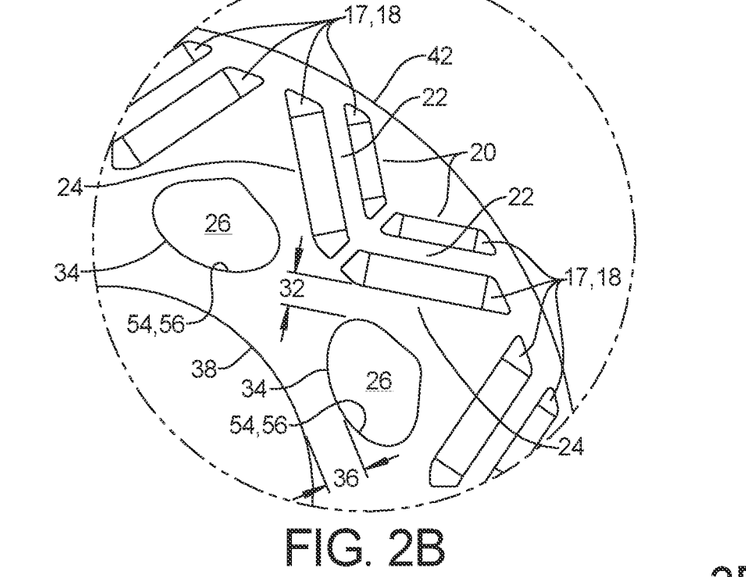
FIG. 2B is an enlarged view of a portion of FIG. 2A.

Referring to FIG. 1, FIG. 2A and FIG. 2B, the core stack 12 includes a plurality of heat conductive inserts 26 extending axially through the core stack 12. The plurality of heat conductive inserts 26 are adapted to conduct heat from inner portions of the core stack 12 outward toward distal ends of the core stack 12. More specifically, a heat conductive insert 26 is associated with each of the groups of magnet slots 18. As shown, the core stack 12 includes eight heat conductive inserts 26. The heat conductive inserts 26 are made from a highly conductive material that will conduct heat away from the permanent magnets positioned within the magnet slots 18 and the outer flux guides 20, the middle flux guides 22 and the inner flux guides 24. This heat is then conducted through the heat conductive inserts 26 axially toward distal ends 28, 30 of the core stack 12 to more evenly distribute heat throughout the core stack 12 and reduce the maximum temperature experienced at any point within the core stack 12.

Referring to FIG. 2A and FIG. 2B, in one exemplary embodiment, the heat conductive insert 26 is a generally oval shape. As shown, eight heat conductive inserts are evenly spaced circumferentially around the core stack 12, positioned between and radially inward of the eight groups of magnet slots 18. To promote efficient heat transfer, the heat conductive inserts 26 are positioned in proximity to the magnet slots 18, however, to maintain structural integrity of the core stack 12 and to avoid interference with the magnetic fields, a minimum distance is preferred. In an exemplary embodiment, each of the plurality of heat conductive inserts 26 is positioned such that a distance 32 between an outer edge 34 of each of the plurality of heat conductive inserts 26 and any portion of any of the plurality of magnet slots 18 is at least 2 millimeters. Furthermore, a distance 36 between the outer edge 34 of each of the plurality of heat conductive inserts 26 and an inner diameter 38 of the core stack 12 is at least 2 millimeters.

Figure 3A:
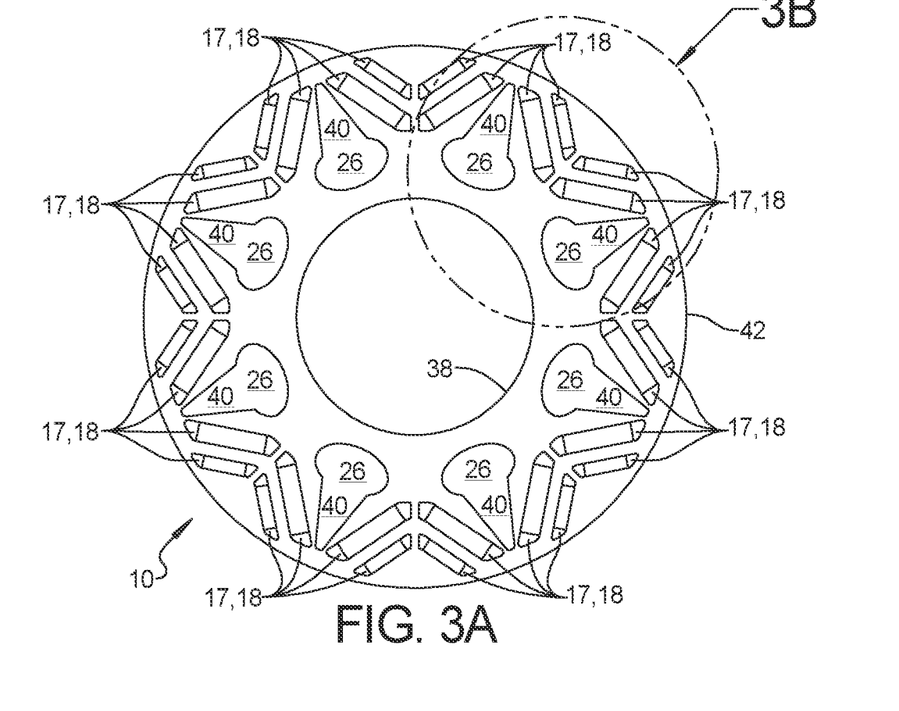
FIG. 3A is an end view of another exemplary embodiment of a core stack.
Figure 3B:
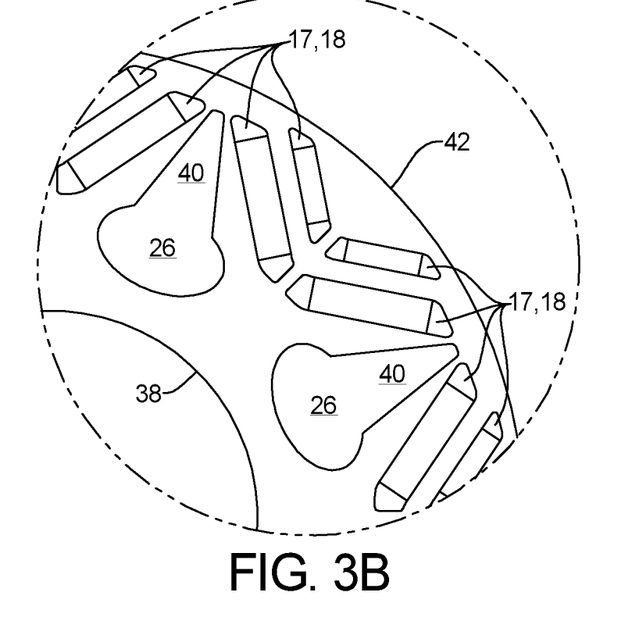
FIG. 3B is an enlarged view of a portion of FIG. 3A.

Referring to FIGS. 3A and 3B, in another exemplary embodiment, each of the heat conductive inserts 26 includes a portion 40 extending radially outward toward an outer diameter 42 of the core stack 12, between the groups of magnet slots 18. In another exemplary embodiment, each of the plurality of heat conductive inserts 26 is positioned such that a distance 32 between an outer edge 34 of any portion of each of the plurality of heat conductive inserts 26, including the portion 40 extending radially outward, and any portion of any of the plurality of magnet slots 18 is at least 2 millimeters. Furthermore, a distance between the outer edge 34 of any portion of the plurality of heat conductive inserts 26, including the portion 40 extending radially outward, and the outer diameter 42 of the core stack 12 is at least 2 millimeters.

Figure 4:
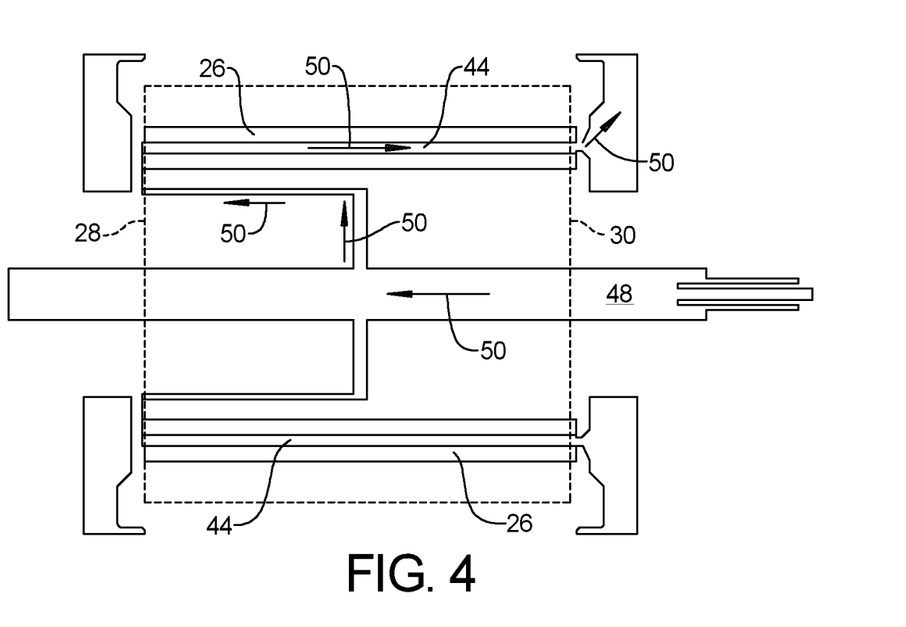
FIG. 4 is a schematic view of a rotor according to an exemplary embodiment including coolant passages and a central cooling system.

Referring to FIG. 4, in an exemplary embodiment each of the plurality of heat conductive inserts 26 includes a coolant passage 44 extending axially through an entire length 46 of the core stack 12. The coolant passage 44 within each of the plurality of heat conductive inserts 26 is connected to a central coolant supply 48. Coolant is fed into the coolant passage 44 of each of the plurality of heat conductive inserts at a first distal end 28 of the core stack 12, flows axially through the heat conductive inserts 26, as indicated by arrow 50, and exits the coolant passage 44 of each of the plurality of heat conductive inserts 26 at a second distal end 30 of the core stack.

Figure 5A:
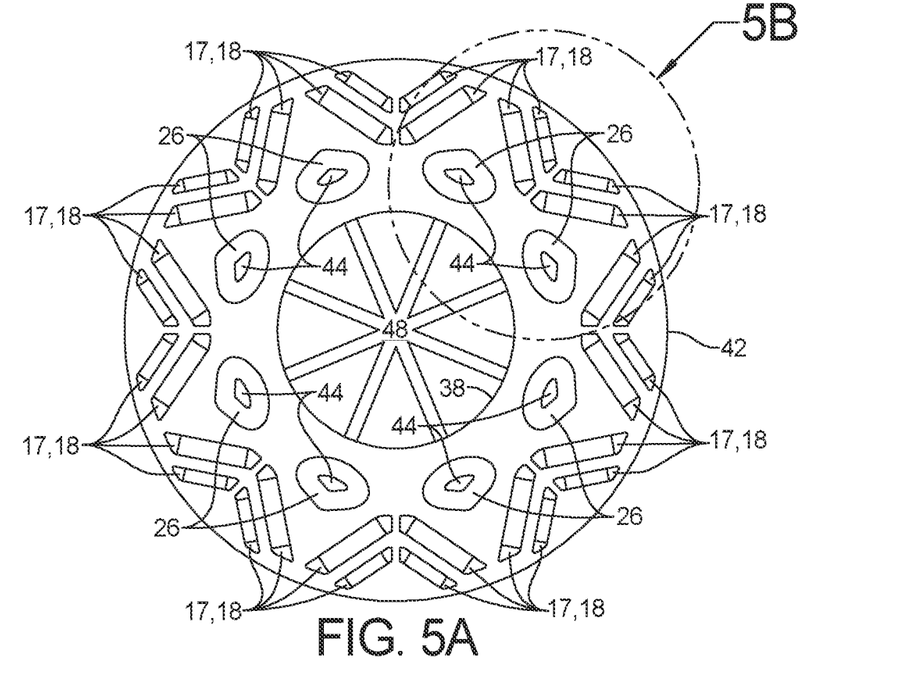
FIG. 5A is an end view of an exemplary embodiment of the core stack shown in FIG. 1, wherein the heat conductive inserts include coolant passages formed therein.
Figure 5B:
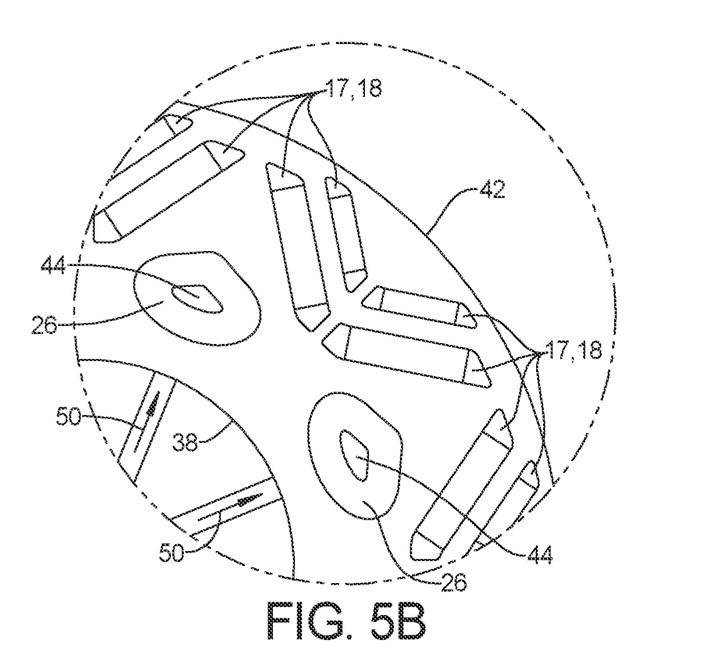
FIG. 5B is an enlarged view of a portion of FIG. 5A.
Figure 6A:
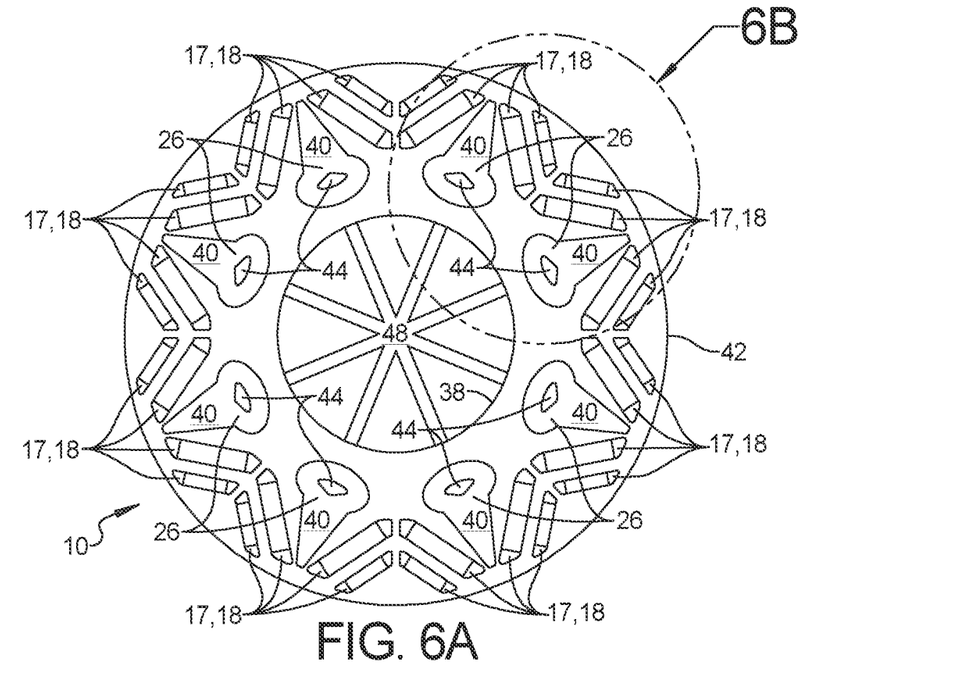
FIG. 6A is an end view of an exemplary embodiment of the core stack shown in FIG. 3A, wherein the heat conductive inserts include coolant passages formed therein.
Figure 6B:
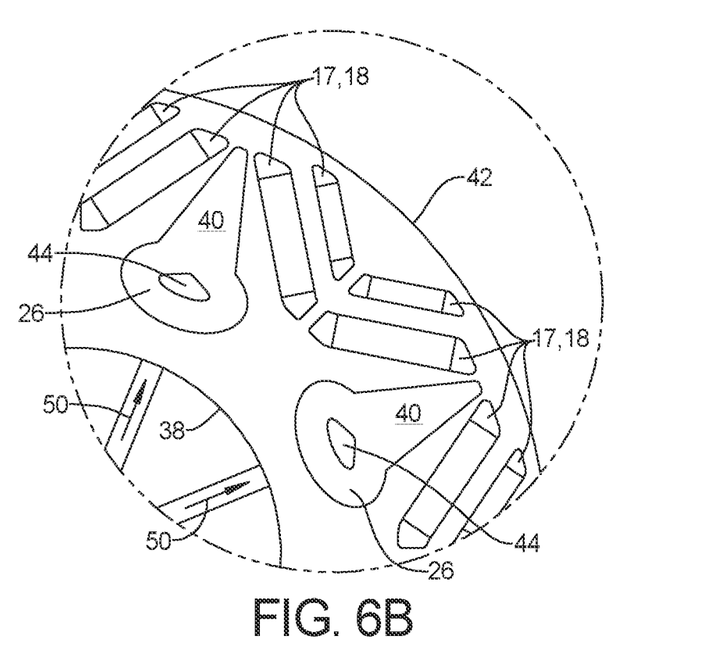
FIG. 6B is an enlarged view of a portion of FIG. 6A.
Figure 7A:
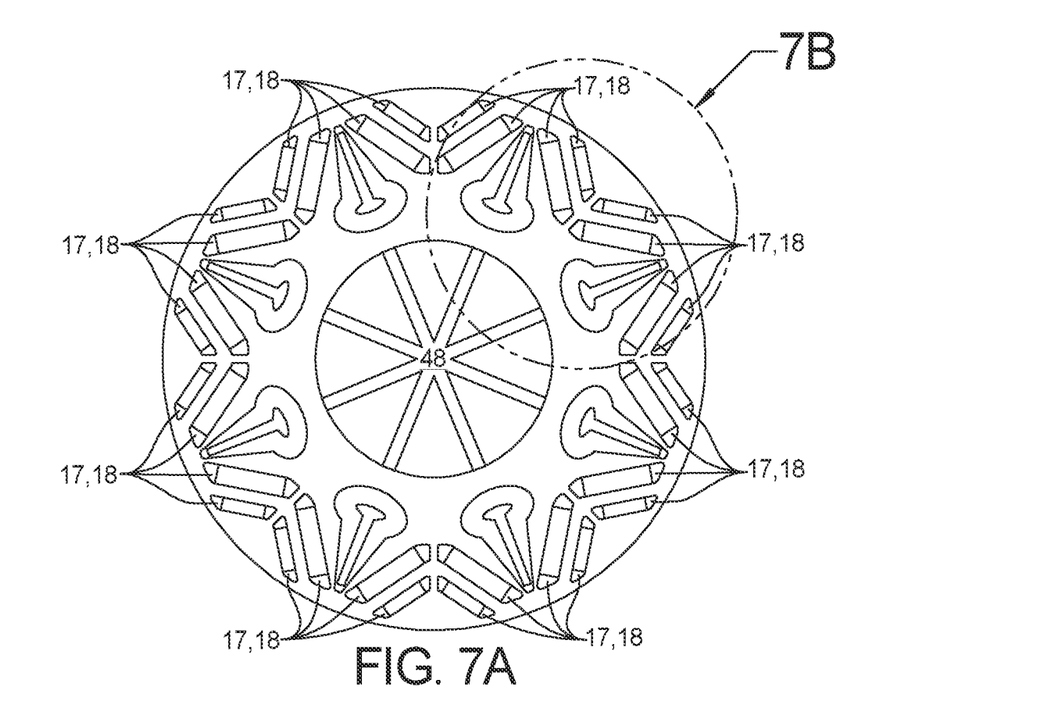
FIG. 7A is an end view of an exemplary embodiment of the core stack shown in FIG. 6A, wherein the coolant passages include a portion extending radially outward.
Figure 7B:
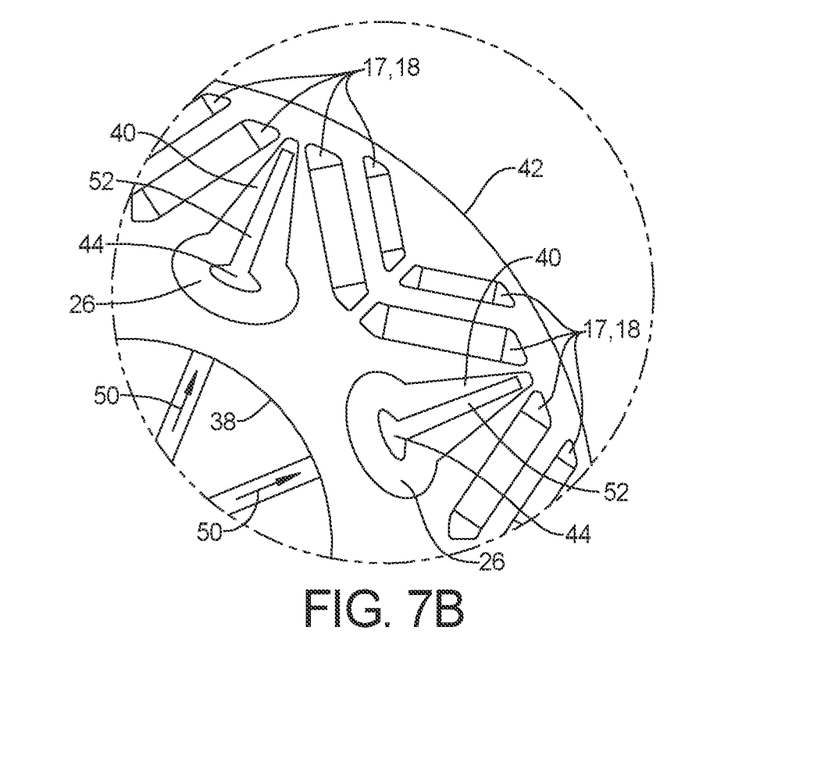
FIG. 7B is an enlarged view of a portion of FIG. 7A.

Referring to FIG. 5A and FIG. 5B, in one exemplary embodiment, the heat conductive insert 26 is a generally oval shaped tube which defines a smaller oval shaped coolant passage 44 therein. Referring to FIG. 6A and FIG. 6B, in another exemplary embodiment, the heat conductive insert 26 includes a generally oval shaped tube which defines a smaller oval shaped coolant passage 44 therein, and further includes a portion 40 extending radially outward toward an outer diameter 42 of the core stack 12, between the groups of magnet slots 18. Referring to FIG. 7A and FIG. 7B, in another exemplary embodiment, the heat conductive insert 26 includes a generally oval shape and includes a portion 40 extending radially outward toward an outer diameter 42 of the core stack 12. The coolant passage 44 also includes a portion 52 that extends radially outward toward an outer diameter 42 of the core stack 12 within the portion 40 of the heat conductive insert 26 that extends radially outward toward the outer diameter 42 of the core stack 12. In all embodiments, the coolant passage 44 is completely defined by the heat conductive insert 26.

Figure 8A:
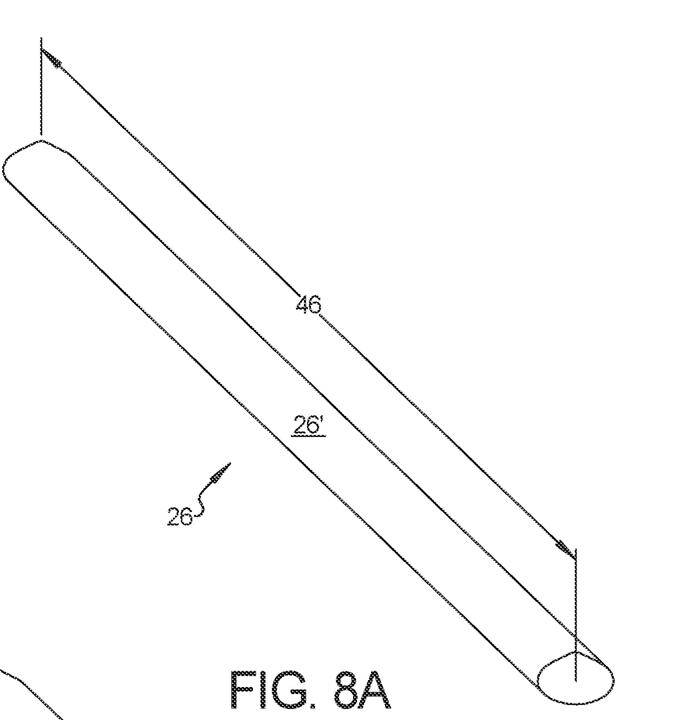
FIG. 8A is a perspective view of a single piece heat conductive insert according to an exemplary embodiment.

Referring to FIG. 8A, in one exemplary embodiment, each of the heat conductive inserts 26 comprises a single column 26' extending axially along the entire length 46 of the core stack 12. Referring again to FIG. 2B, in one exemplary embodiment, each of the plurality of lamination plates 14 includes a plurality of openings 54 formed therein. When the plurality of lamination plates 14 are assembled to form the core stack 12, the plurality of openings 54 within each of the plurality of lamination plates 14 are axially aligned and define a plurality of axial cavities 56 extending axially through the core stack. Each of the plurality of heat conductive inserts 26' comprises a column of cast in place heat conductive material within one of the plurality of axial cavities 56. In another exemplary embodiment, each of the plurality of heat conductive inserts 26' comprises a column of heat conductive material that is machined or cast outside of the core stack 12 and inserted within one of the plurality of axial cavities 56 after the core stack 12 is formed. A single piece heat conductive insert 26' in combination with a coolant passage 44 offers the advantage of providing a sealed coolant path from the first distal end 28 of the core stack 12 to the second distal end 30 of the core stack 12. This eliminates the possibility of coolant leaking from the core stack 12 between the lamination plates 14.

Figure 8B:
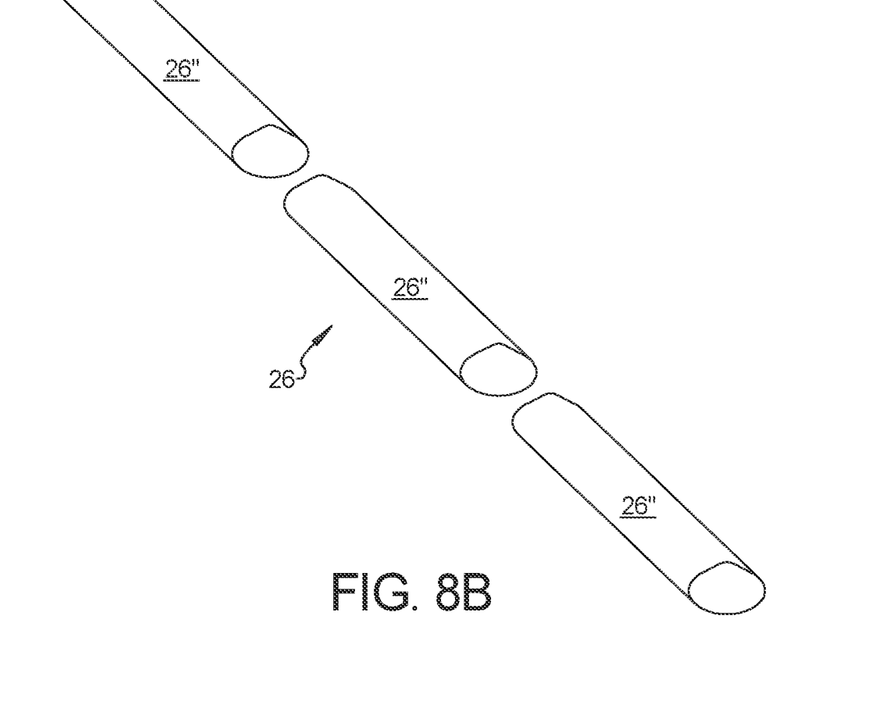
FIG. 8B is a perspective view of a heat conductive insert including column segments according to another exemplary embodiment.
Figures 8C, 8D:
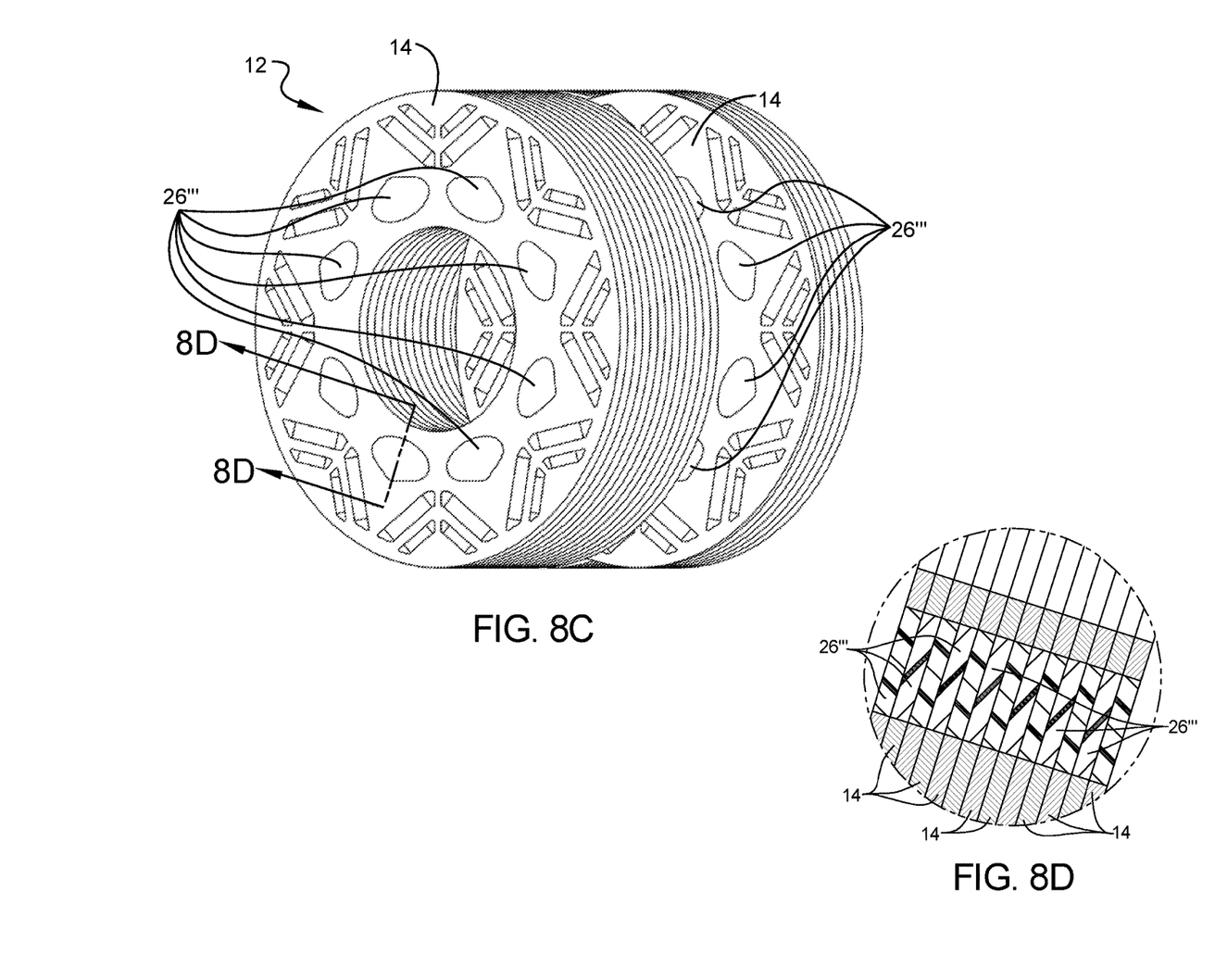
FIGS. 8C-8D are a perspective view and cross-sectional view of a rotor stack with one lamination plate partially removed and including a plurality of column slices of a plurality of heat conductive inserts according to another exemplary embodiment.

Referring to FIG. 8B, in another exemplary embodiment, each insert 26 comprises a plurality of column segments 26" axially aligned and extending axially along the entire length 46 of the core stack 12. As shown, the insert 26 includes three column segments 26". Each of the column segments 26" extends through a portion of the plurality of lamination plates 14 and when inserted within the core stack 12, end to end, extend axially through the entire length 46 of the core stack 12. Referring to FIG. 8C, wherein one of the lamination plates 14 is shown partially removed from the core stack 12, in another exemplary embodiment, each insert 26 comprises a plurality of column slices 26''' axially aligned and extending axially along the entire length 46 of the core stack 12. Each individual column slice 26'''' is approximately the same thickness as one lamination plate 14 (as shown in FIG. 8D). One column slice 26''' of each insert 26 is positioned within each lamination plate 14. When the lamination plates 14 are axially aligned along the central axis 16 of the core stack 12, the individual column slices 26''' line up to form the heat conductive inserts 26. As shown, each lamination plate 14 includes eight column slices 26''' positioned therein. When the lamination plates 14 are axially aligned along the central axis 16 of the core stack 12, the individual column slices 26''' line up to form eight heat conductive inserts 26.

A rotor core of the present disclosure offers the advantage of spreading heat generated within the rotor core more evenly across the rotor core and lowers the maximum temperatures experienced by the rotor core. This increases the efficiency of the magnetic flux within the rotor core, such that an electric machine utilizing a rotor core as disclosed herein can use smaller permanent magnets to provide motor torque equal to a rotor core using larger permanent magnets, thereby improving cost and packaging characteristics of the rotor core, or alternatively, an electric machine utilizing a rotor core as disclosed herein will exhibit increased motor torque, power and operating speed, as compared to an electric machine having similarly sized permanent magnets without heat conductive inserts.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A rotor core for an electric machine of an automobile, comprising:
    a core stack including a plurality of identical lamination plates;
    each lamination plate including a plurality of magnet slots formed therein, the magnet slots of each of the lamination plates axially aligned and adapted to support a plurality of permanent magnets therein; and
    a plurality of heat conductive inserts extending axially through the core stack and adapted to conduct heat from inner portions of the core stack outward toward distal ends of the core stack, wherein each of the plurality of heat conductive inserts includes a coolant passage, and wherein the coolant passage is disposed within a periphery of each of the plurality of heat conductive inserts and extends axially through each of the plurality of heat conductive inserts.

2. The rotor core of claim 1, wherein each of the plurality of heat conductive inserts comprises a single column extending axially through an entire length of the core stack and wherein the coolant passage extends axially through the entire length of the core stack.

3. The rotor core of claim 2, wherein each of the plurality of lamination plates includes a plurality of openings formed therein, wherein when the plurality of lamination plates are assembled to form the core stack, the plurality of openings within each of the plurality of lamination plates are axially aligned and define a plurality of axial cavities extending axially through the core stack, each of the plurality of heat conductive inserts comprising a column of cast in place heat conductive material within one of the plurality of axial cavities.

4. The rotor core of claim 2, wherein each of the plurality of lamination plates includes a plurality of openings formed therein, wherein when the plurality of lamination plates are assembled to form the core stack, the plurality of openings within each of the plurality of lamination plates are axially aligned and define a plurality of axial cavities extending axially through the core stack, each of the plurality of heat conductive inserts comprising a column of heat conductive material that is inserted within one of the plurality of axial cavities.

5. The rotor core of claim 1, wherein the coolant passage within each of the plurality of heat conductive inserts is connected to a central coolant supply, wherein coolant is fed into the coolant passage of each of the plurality of heat conductive inserts at a first distal end of the rotor, and exits the coolant passage of each of the plurality of heat conductive inserts at a second distal end of the rotor.

6. The rotor core of claim 1, wherein each of the plurality of heat conductive inserts is positioned such that a distance between an outer edge of each of the plurality of heat conductive inserts and any portion of any of the plurality of magnet slots is at least 2 millimeters, and a distance between the outer edge of each of the plurality of heat conductive inserts and an inner diameter of the core stack is at least 2 millimeters.

7. The rotor core of claim 1, wherein each of the plurality of heat conductive inserts has an oval cross-sectional shape.

8. The rotor core of claim 1, wherein the coolant passage has an oval cross-sectional shape disposed within the heat conductive insert.

9. A rotor core for an electric machine of an automobile, comprising:
a core stack including a plurality of lamination plates;
each of the plurality of lamination plates including a plurality of magnet slots formed therein, the magnet slots of each of the plurality of lamination plates are axially aligned and adapted to support a plurality of permanent magnets therein; and
a plurality of heat conductive inserts extending axially through the core stack and adapted to conduct heat from inner portions of the core stack outward toward distal ends of the core stack, wherein each of the plurality of heat conductive inserts comprises a plurality of column slices axially aligned through an entire length of the core stack, wherein a thickness of each of the plurality of column slices is approximately equal to a thickness of one of the plurality of lamination plates.

10. The rotor core of claim 9, wherein the plurality of column slices extend axially through an entire length of the core stack.

11. The rotor core of claim 10, wherein each of the plurality of lamination plates includes a plurality of openings formed therein, wherein the plurality of lamination plates are assembled to form the core stack, the plurality of openings within each of the plurality of lamination plates are axially aligned and define a plurality of axial cavities extending axially through the core stack, each of the plurality of column slices comprises a column of cast in place heat conductive material within one of the plurality of axial cavities.

12. The rotor core of claim 10, wherein each of the plurality of lamination plates includes a plurality of openings formed therein, wherein the plurality of lamination plates are assembled to form the core stack, the plurality of openings within each of the plurality of lamination plates are axially aligned and define a plurality of axial cavities extending axially through the core stack, each of the plurality of column slices comprises a column of heat conductive material that is inserted within one of the plurality of axial cavities.

13. The rotor core of claim 9, wherein each of the plurality of column slices are axially aligned and extend axially through each of the plurality of lamination plates.

14. The rotor core of claim 9, wherein each of the plurality of column slices are positioned such that a distance between an outer edge of each of the plurality of column slices and any portion of any of the plurality of magnet slots is at least 2 millimeters, and a distance between the outer edge of each of the plurality of column slices and an inner diameter of the core stack is at least 2 millimeters.

* * * * *